June 5, 1956 W. J. COOPER 2,748,476
PORTABLE DEVICE FOR TRIMMING TREES
Filed Oct. 29, 1954 2 Sheets-Sheet 1
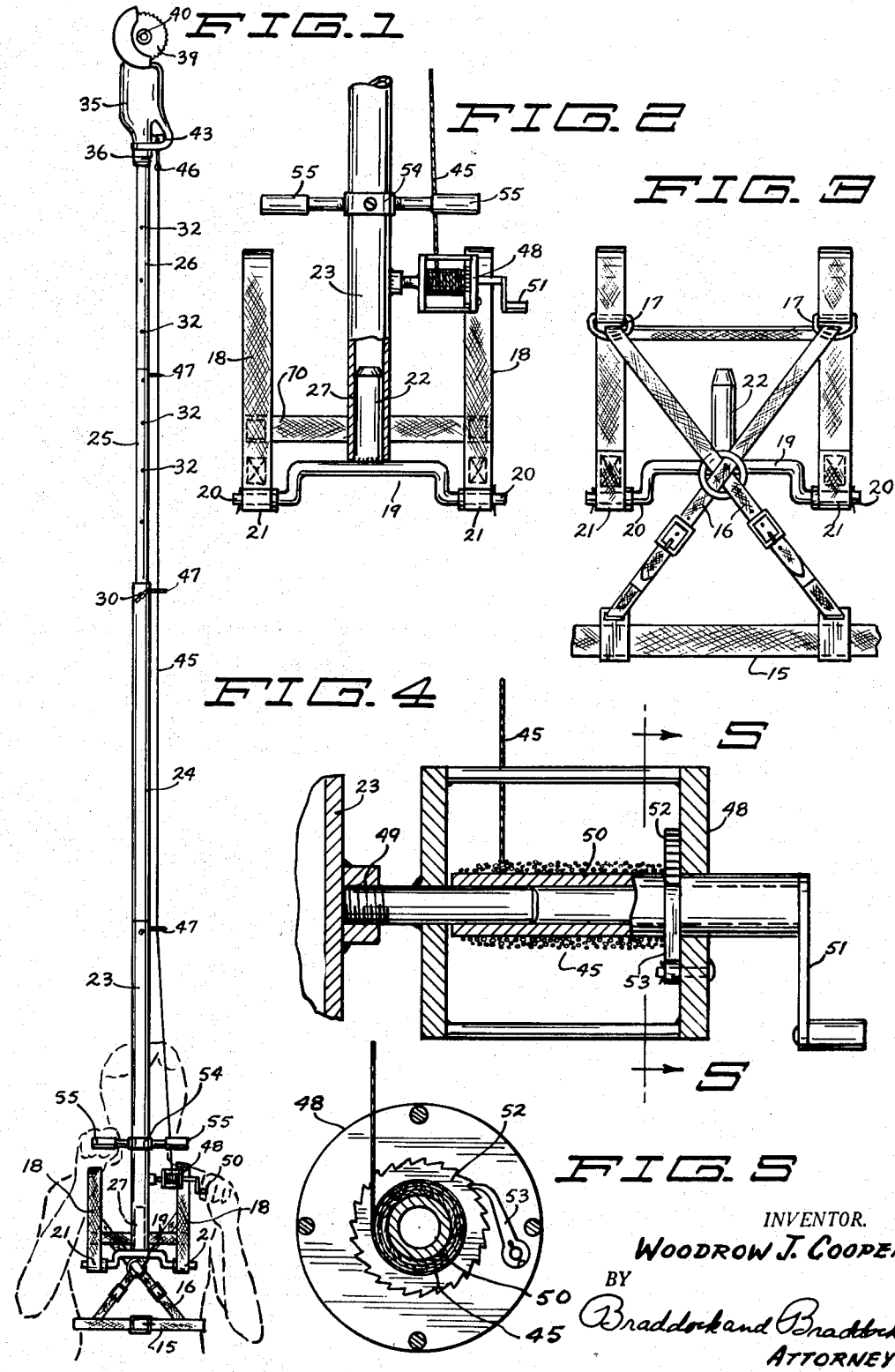
INVENTOR.
WOODROW J. COOPER
BY
Braddock and Braddock
ATTORNEYS June 5, 1956  W. J. COOPER  2,748,476
PORTABLE DEVICE FOR TRIMMING TREES
Filed Oct. 29, 1954  2 Sheets-Sheet 2
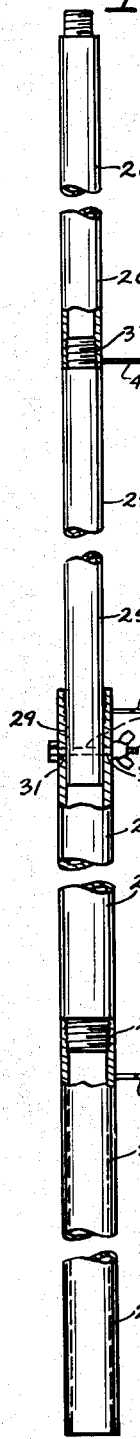
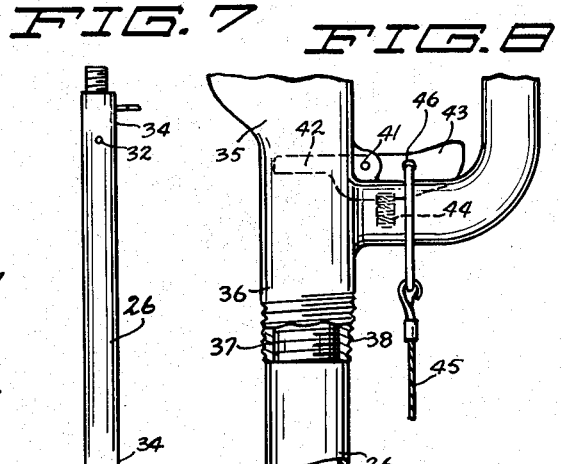
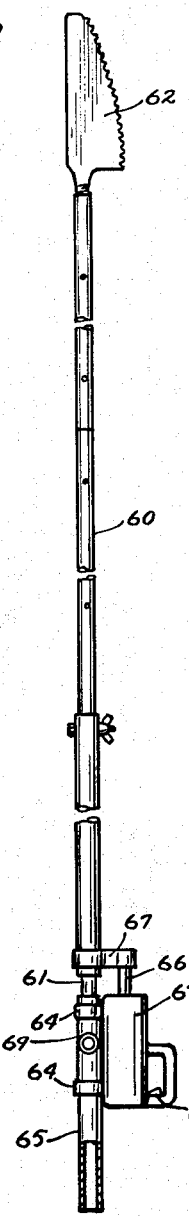
INVENTOR.
WOODROW J. COOPER
BY
Braddock and Braddock
ATTORNEYS United States Patent Office 2,748,476
Patented June 5, 1956

2,748,476

PORTABLE DEVICE FOR TRIMMING TREES

Woodrow J. Cooper, Minneapolis, Minn.

Application October 29, 1954, Serial No. 465,461

1 Claim. (Cl. 30—167)

The invention herein has relation to a portable device to be employed for the purpose of pruning trees.

The object of this invention is to provide a device of the present general character which will be of new, improved, inexpensive, practical and efficient construction.

In the accompanying drawings forming a part of this specification,

Fig. 1 is an elevational view of a device made according to the invention as when upon the person of an operator and ready to be put to use;

Fig. 2 is an enlarged fragmentary front elevational view, partially in section and partially broken away, detailing features at a lower portion of the disclosure of Fig. 1;

Fig. 3 is an enlarged rear elevational view, partially broken away, of a supporting unit of the device as when removed from the remainder thereof;

Fig. 4 is an enlarged vertical sectional view of a reel of the device;

Fig. 5 is a detail sectional view, taken as on line 5—5 in Fig. 4;

Fig. 6 is an enlarged elevational view, partially in section and partially broken away, of a pole assembly of the device;

Fig. 7 is an elevational view of a pole of the pole assembly of Fig. 6;

Fig. 8 is an enlarged fragmentary elevational view, partially in section and partially broken away, the detailing features at an upper portion of the disclosure of Fig. 1; and Fig. 9 is an elevational view, partially broken away, of a device of modified construction incorporating features and characteristics of the invention.

A supporting unit of the device includes what may be termed a harness to be removably fastened upon the body of an operator. An adjustable belt 15 of the supporting unit or harness is for fastening around the waist, and crossed straps 16 extend upwardly from the belt at the rear of the operator. The crossed straps 16 are suitably and conveniently secured, as at 17, to the rearward ends of right and left straps 18, 18 which extend up over the shoulders and down in front of the operator. A chest strap 70 connects the straps 18, 18 across the chest of the operator. The belt 15, and the straps 16 and 18 can be of any suitable material, and the chest strap 70 desirably can be of elastic webbing. The lower ends of the straps 18 as shown terminate at an elevation intermediate the shoulders and the waist.

A rigid horizontal yoke 19 of the supporting unit includes an off set intermediate portion between the right and left straps 18, 18, and opposite end portions 20, 20 of the yoke are rotatably supported, as at 21, 21 in lower end portion of said right and left straps. A rigid post or shank 22 secured to and extending upwardly from the midlength of the off set portion of said yoke is for supporting an upright pole assembly of the device.

As disclosed, said upright pole assembly includes four poles, denoted 23, 24, 25 and 26, respectively. It is to be understood, however, that a pole assembly employed as part of a device according to the invention could include a greater or less number of poles than four. The poles 23, 24 and 25, 26, respectively, constitute lower and upper pole units of the pole assembly. All of the poles 23, 24, 25, 26 are as shown hollow cylindrical members of rigid material. The poles 23, 24 are of equal diameter, as are also the poles 25, 26, and the lower pole unit is of greater diameter than is the upper pole unit.

The pole 23 is the lower pole of the lower pole unit and has its lower end portion snugly longitudinally slidably supported and rotatable, as at 27, upon the post or shank 22 to be removable therefrom and its lower end normally rested upon the offset intermediate portion of the yoke 19. The pole 24 is the upper pole of the lower pole unit and has its lower end portion detachably threadably engaged, as at 28, with the threaded upper end portion of the pole 23. Stated differently, the pole 24 is rigidly, detachably supported upon the pole 23.

The pole 25 is the lower pole of the upper pole unit and has its lower end portion telescopically received, as at 29, in the upper end portion of the pole 24. A cross pin 30 for removable insertion in horizontal openings, designated 31 and 32, respectively, through an upper portion of the pole 24 and through the pole 25, is for fixedly, detachably securing said pole 25 to and upon said pole 24. The horizontal openings 32 are longitudinally spaced along the pole 25 in order that any desired portion of the length of said pole 25 can be made to project above the upper end of said pole 24. The pole 26 is the upper pole of the upper pole unit and has its lower end portion detachably threadably engaged, as at 33, with the threaded upper end portion of the pole 25. That is, the pole 26 is rigidly, detachably supported upon the pole 25. The poles 25 and 26 desirably can be calibrated, as at 34, so that the overall length, say, for example, in feet, of the pole assembly will be readily ascertainable.

A frame 35 of the power saw of the device is detachably supported upon the upper end portion of the pole assembly. A tubular projection 36 integral with and extending downwardly from the power saw frame 35, has its lower end portion internally threaded, as at 37, for detachable reception of the externally threaded upper end portion of the pole 26. Also, the lower end portion of the tubular projection 36 is externally threaded, as at 38, to be detachably received in the internally threaded upper end portion of the pole 24. Stated otherwise, the power saw frame 35 can be detachably supported upon the upper end portion of the upper pole 26 at the upper pole unit of the pole assembly, as in Figs. 1 and 8, or can be detachably supported upon the upper end portion of the upper pole 24 of the lower pole unit of said pole assembly.

A rotary saw blade 39 of the power saw, mounted thereon as at 40, can be propelled in any ordinary or preferred manner, as by an electric motor or internal combustion engine (not shown) within the frame 35. A control lever for starting and stopping the drive mechanism employed has an intermediate portion thereof mounted, as at 41, upon the frame 35. An interiorly extending arm 42 of said control lever is for acting upon parts of the drive mechanism to be controlled, and an externally extending arm 43 of the control lever is to be manipulated to actuate the interiorly extending arm 42 to the "on" position of said drive mechanism against resilient action of a compression coil spring 44 which normally retains said control lever in the "off" position of the drive mechanism.

A control lever actuating cable 45 has an upper end thereof suitably and conveniently secured, as at 46, to an intermediate portion of the exteriorly extending arm 43 of said control lever, and said cable 45 extends downwardly from said arm 43 through spaced eyelets 47 upon the poles of the pole assembly to a reel 48 suitably and conveniently supported, as at 49, upon a lower portion of the lowermost pole 23.

The reel 48 includes a winding drum 50 with operating handle 51. A ratchet 52 upon said winding drum is detachably engageable by a pawl 53 upon the reel frame for locking the drum against turning movement. When it is desired that the power saw drive mechanism be operative, the operating handle will be turned to actuate the control lever to the "on" position of said drive mechanism, and the pawl will be lockingly engaged with the ratchet. When it is desired that the power saw drive mechanism be inoperative, the pawl will be released manually from the ratchet so that the compression coil spring will become operative to actuate said control lever to the "off" position of said drive mechanism.

A lower portion of the lowermost pole 23 fixedly supports, as at 54, an actuator including hand grip pieces 55, 55 extending from opposite sides of said pole 23 for accomplishing manipulation of the pole assembly and the elements of the device which are supported by said pole assembly. The hand grip pieces 55, 55, as well as the operating handle 51 of the reel, are situated to be conviently accessible to an operator upon whom the device is supported, about as disclosed in Fig. 1 of the drawings.

The manner in which the device is to be put to use will be apparent. An operator can move the pole assembly and the power saw and reel thereon upwardly and downwardly, as well as rotate said pole assembly, power saw and reel and swing them forwardly and rearwardly, to the accomplishment of practical operation of the device. The construction and arrangement are such that a tree or tree limb can be cut off at any angle which may be preferred, as when it is desirable that a tree or tree limb be made to fall in a predetermined direction. The device can of course be employed in connection with sprayers or other tree treating units.

In Fig. 9 of the drawings there is disclosed a pole assembly 60, which can be the equivalent of the pole assembly of Figs. 1 and 6, supported upon an upright stud 61 for reciprocation longitudinally thereof. An elongated reciprocatory saw blade 62 can be detachably secured upon the upper end of the pole assembly 60 to aline therewith in the same manner as the power saw frame 35 is detachably secured upon the upper end of the pole assembly of Figs. 1 and 8.

A frame 63 rigidly secured, as at 64, upon an upright tubular member 65 houses drive mechanism (not shown) for accomplishing reciprocation of the saw blade 62 through the instrumentality of an upwardly extending reciprocating rod 66 suitably and conveniently secured, as at 67, to a lower end portion of the pole assembly 60. A control element 68 is manipulable to render the reciprocatory saw drive mechanism operative and inoperative. The stud 61 is rigid and in alinement with the upright tubular member 65.

Said upright tubular member is for removably supporting the frame 63 upon a post or shank such as 22 in the same general manner as the pole assembly of Figs. 1 and 2 is supported, and an actuator including hand grip pieces 69, equivalent to the hand grip pieces 55, upon said upright tubular member 65 is for accomplishing manipulation of said frame 63 and appurtenant parts in the same general manner as said hand grip pieces 55 are for accomplishing manipulation of the pole assembly and appurtenant parts of Fig. 1 of the drawings.

During practical operation of the device of Fig. 9, the upright tubular member 65 will be manipulated in the manner as hereinbefore set forth in connection with the disclosure of Figs. 1 to 8, and the drive mechanism within the frame 63 will when operative accomplish reciprocation of the blade 62 through the instrumentality of the reciprocatory rod 66 and the pole assembly 60. Of course during its reciprocation said pole assembly 60 will move upwardly and downwardly on the stud 61.

What is claimed is:

In a device for trimming trees, a harness including spaced apart, vertical straps to be supported upon the right and left shoulders, respectively, of a person, a horizontal member between said straps, bearings rotatably supporting opposite ends, respectively, of said horizontal member in lower end portions of said straps, an upright post rigid with an intermediate portion of said horizontal member, an upright pole assembly having a lower end portion thereof snugly rotatable and longitudinally slidable upon said upright post, a frame upon an upper portion of said pole assembly, a saw blade supported by said frame, said pole assembly being swingable upon said bearings together with said upright post and horizontal member as a unit forwardly and rearwardly of said vertical straps, and a hand grip rigid with said lower end portion of said pole assembly manually manipulatable to accomplish rotary and longitudinal sliding movement of said pole assembly upon said upright post.

References Cited in the file of this patent

UNITED STATES PATENTS

| | | |
|---|---|---|
| 1,251,554 | Marvin | Jan. 1, 1918 |
| 1,579,783 | Ross | Apr. 6, 1926 |
| 1,805,864 | Benzel | May 19, 1931 |
| 1,877,032 | Ortt | Sept. 13, 1932 |
| 1,985,985 | Gerline | Jan. 1, 1935 |
| 2,139,188 | Haislip | Dec. 6, 1938 |
| 2,271,136 | Geiger | Jan. 27, 1942 |
| 2,555,428 | Tuttle | June 5, 1951 |